United States Patent
Ravuri (10) Patent No.: US 12,330,670 B2
(45) Date of Patent: Jun. 17, 2025

(54) VEHICULAR DRIVING ASSIST SYSTEM WITH STUDENT DRIVER MODE

(71) Applicant: Magna Electronics Inc., Auburn Hills, MI (US)

(72) Inventor: Naresh Ravuri, Novi, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 181 days.

(21) Appl. No.: 18/343,867

(22) Filed: Jun. 29, 2023

(65) Prior Publication Data
US 2024/0001950 A1 Jan. 4, 2024

Related U.S. Application Data

(60) Provisional application No. 63/367,504, filed on Jul. 1, 2022.

(51) Int. Cl.
*B60W 50/12* (2012.01)
*B60W 40/08* (2012.01)
*B60W 50/16* (2020.01)

(52) U.S. Cl.
CPC ............ *B60W 50/12* (2013.01); *B60W 40/08* (2013.01); *B60W 50/16* (2013.01); *B60W 2420/403* (2013.01); *B60W 2420/408* (2024.01); *B60W 2540/043* (2020.02)

(58) Field of Classification Search
CPC ...... B60W 50/12; B60W 40/08; B60W 50/16; B60W 2540/043; B60W 2420/408; B60W 2420/403; B60W 40/09; B60W 2040/0854
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 7,914,187 B2 | 3/2011 | Higgins-Luthman et al. |
| 9,405,120 B2 | 8/2016 | Graf et al. |
| 9,925,980 B2 | 3/2018 | Edo Ros |
| 10,017,114 B2 | 7/2018 | Bongwald |
| 10,065,574 B2 | 9/2018 | Tiryaki |
| 10,071,687 B2 | 9/2018 | Ihlenburg et al. |
| 10,099,614 B2 | 10/2018 | Diessner |
| 10,688,993 B2 | 6/2020 | Johnson et al. |
| 10,958,830 B2 | 3/2021 | Koravadi |

(Continued)

*Primary Examiner* — Jacob M Amick
(74) *Attorney, Agent, or Firm* — HONIGMAN LLP (57) ABSTRACT

A vehicular control system includes a sensor disposed at a vehicle and sensing exterior and at least forward of the vehicle. The vehicular control system is operable in a student driver mode. The vehicular control system, responsive to processing the sensor data, determines when the vehicle is undertaking a parking maneuver. The vehicular control system, responsive to determining that the vehicle is undertaking a parking maneuver and when the vehicular control system is operating in the student driver mode, determines when an acceleration of the vehicle is unintentional. The vehicular control system, responsive to determining that the acceleration of the vehicle is unintentional, limits acceleration of the vehicle.

23 Claims, 6 Drawing Sheets

(56) References Cited

U.S. PATENT DOCUMENTS

| | | | |
|---|---|---|---|
| 11,465,561 B2 | 10/2022 | Peterson et al. | |
| 11,518,401 B2 | 12/2022 | Kulkarni | |
| 11,639,134 B1 | 5/2023 | Huizen et al. | |
| 11,780,372 B2 | 10/2023 | Sobecki et al. | |
| 11,827,153 B2 | 11/2023 | Miller et al. | |
| 11,854,276 B2 | 12/2023 | Wacquant | |
| 12,145,616 B2 | 11/2024 | Sobecki et al. | |
| 2008/0065293 A1* | 3/2008 | Placke | B60W 50/14 |
| | | | 701/41 |
| 2008/0255722 A1* | 10/2008 | McClellan | B60R 25/102 |
| | | | 340/439 |
| 2015/0009010 A1 | 1/2015 | Biemer | |
| 2019/0337532 A1* | 11/2019 | Myers | G08G 1/0962 |

* cited by examiner

VEHICULAR DRIVING ASSIST SYSTEM WITH STUDENT DRIVER MODE

CROSS REFERENCE TO RELATED APPLICATION

The present application claims the filing benefits of U.S. provisional application Ser. No. 63/367,504 filed Jul. 1, 2022, which is hereby incorporated herein by reference in its entirety.

FIELD OF THE INVENTION

The present invention relates generally to a vehicle control system for a vehicle and, more particularly, to a vehicle control system that utilizes one or more sensors at a vehicle.

BACKGROUND OF THE INVENTION

Use of sensors in vehicle imaging systems is common and known. Examples of known imaging sensor systems are described in U.S. Pat. Nos. 10,688,993; 9,925,980; 5,949,331; 5,670,935 and/or 5,550,677, which are hereby incorporated herein by reference in their entireties.

SUMMARY OF THE INVENTION

A vehicular control system includes a sensor disposed at a vehicle equipped with the vehicular control system and sensing at least forward of the vehicle. The sensor captures sensor data. The system includes an electronic control unit (ECU) with electronic circuitry and associated software. The electronic circuitry of the ECU includes a processor for processing sensor data captured by the sensor. The vehicular control system is operable in a student driver mode. The vehicular control system, via processing of sensor data captured by the sensor, determines when the vehicle is undertaking a parking maneuver. The vehicular control system, responsive to determining that the vehicle is undertaking the parking maneuver and when the vehicular control system is operating in the student driver mode, determines that an acceleration of the vehicle is unintentional. The vehicular control system, responsive to determining that the acceleration of the vehicle is unintentional, limits acceleration of the vehicle.

These and other objects, advantages, purposes and features of the present invention will become apparent upon review of the following specification in conjunction with the drawings.

DESCRIPTION OF THE PREFERRED EMBODIMENTS

A vehicle control system and/or driver or driving assist system and/or object detection system and/or alert system operates to capture sensor data representative of the exterior of the vehicle and may process the captured sensor data to detect objects at or near the vehicle and in the predicted path of the vehicle, such as to assist a driver of the vehicle in maneuvering the vehicle in a forward or rearward direction. The control system includes a data processor (such as an image processor or image processing system) that is operable to receive sensor data from one or more sensors (such as image data from one or more cameras). The system may process captured image data and provide an output to a display device for displaying images representative of the captured image data. Optionally, the control system may provide a display, such as a rearview display or a top down or bird's eye or surround view display or the like.

Figure 1:
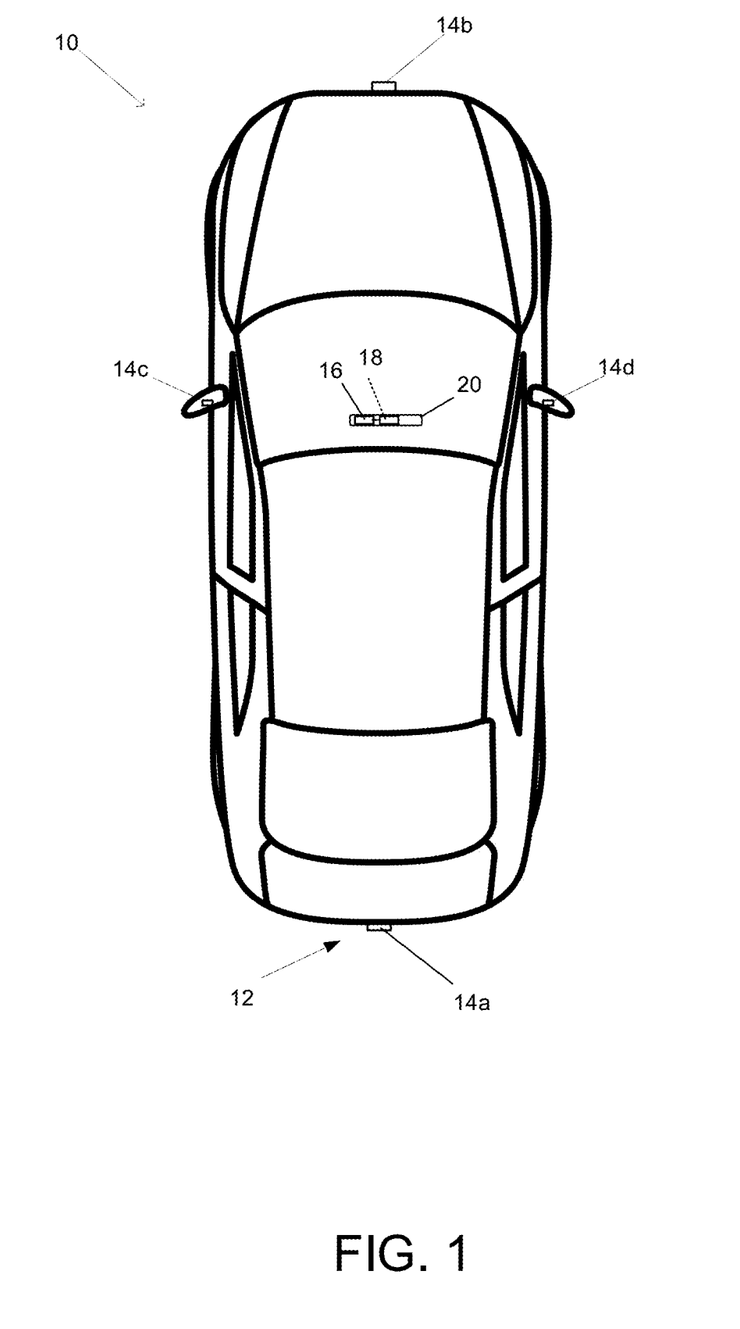
FIG. 1 is a plan view of a vehicle with a control system that incorporates sensors such as cameras or radar sensors.

Referring now to the drawings and the illustrative embodiments depicted therein, a vehicle 10 includes a sensing system 12 that includes at least one exterior sensing sensor, such as at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). The sensors 14a, 14b, 14c, 14d in FIG. 1 may comprise exterior viewing cameras and/or exterior non-imaging sensors (e.g., radar sensors and/or lidar sensors). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The sensing system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Many modern vehicles come equipped with many different operating modes such as a sports mode, a winter mode, an economy mode, a comfort mode, an electric mode, etc. These modes change the behavior and handling of the vehicle in various ways. Implementations herein include a new student driving mode (also referred to herein as learning driver mode). The student mode may be activated in any other mode combination and helps reduce accidents while a new or inexperienced driver is learning how to properly operate the vehicle. For example, new drivers may mistake the acceleration pedal for the brake pedal.

The student driving mode or learning driver mode may limit some control of the vehicle such as unintended or unexpected acceleration. That is, when a student driver or new driver unintentionally presses the acceleration pedal instead of the brake pedal, the vehicle, while in student driving mode, may be limited to a maximum acceleration/ throttle/velocity that is lower than the vehicle's maximum acceleration. As another example, the system may limit acceleration/velocity when objects are detected in front (or predicted to cross in front of the vehicle) of the vehicle (e.g., via the sensing system 12 of FIG. 1) such as another vehicle, pedestrians, a building, etc.

Figure 2:
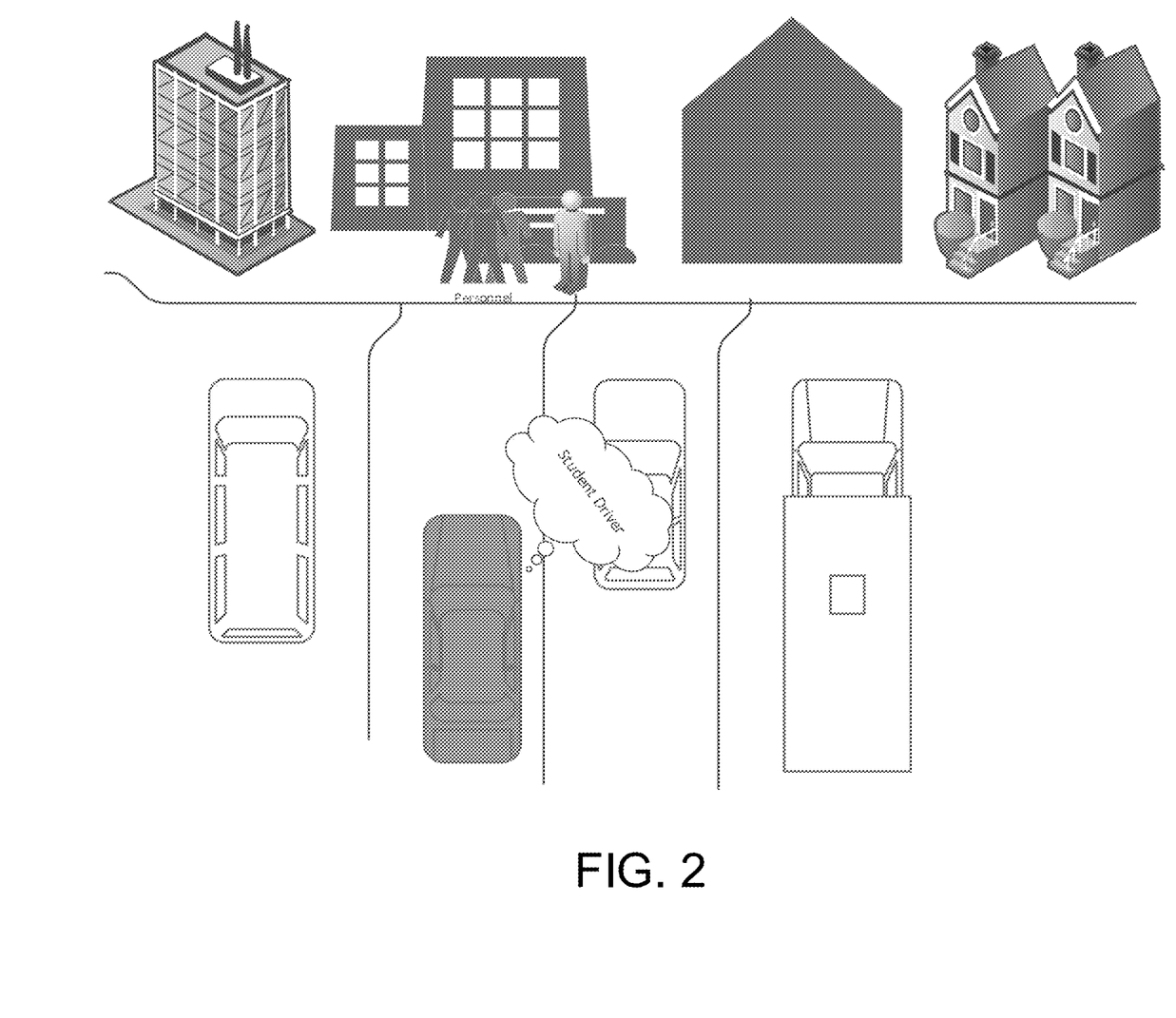
FIG. 2 is a view of a student driver entering a parking space in a vehicle.
Figure 3:
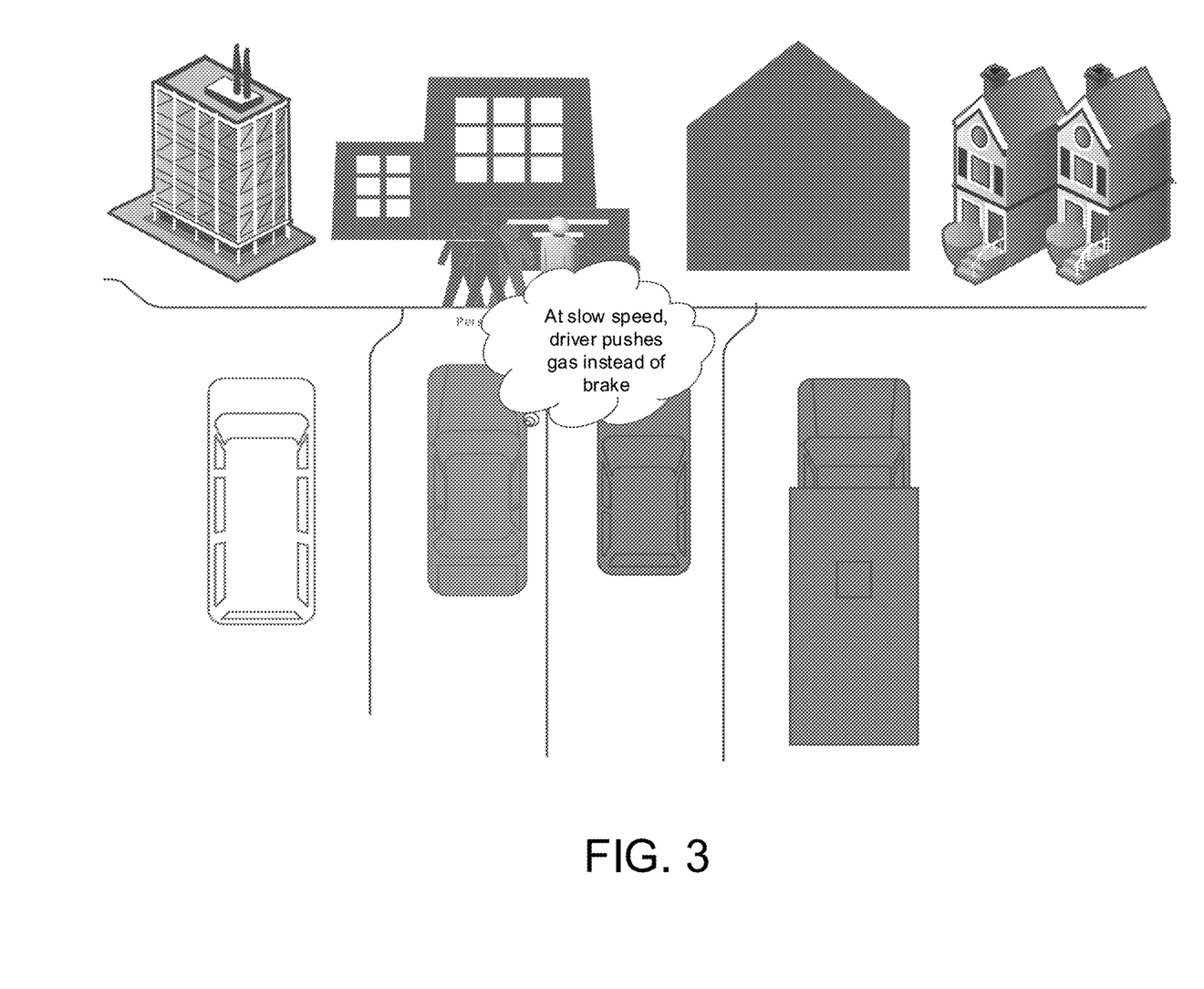
FIG. 3 is a view of the student driver of FIG. 2 unintentionally accelerating the vehicle.
Figure 4:
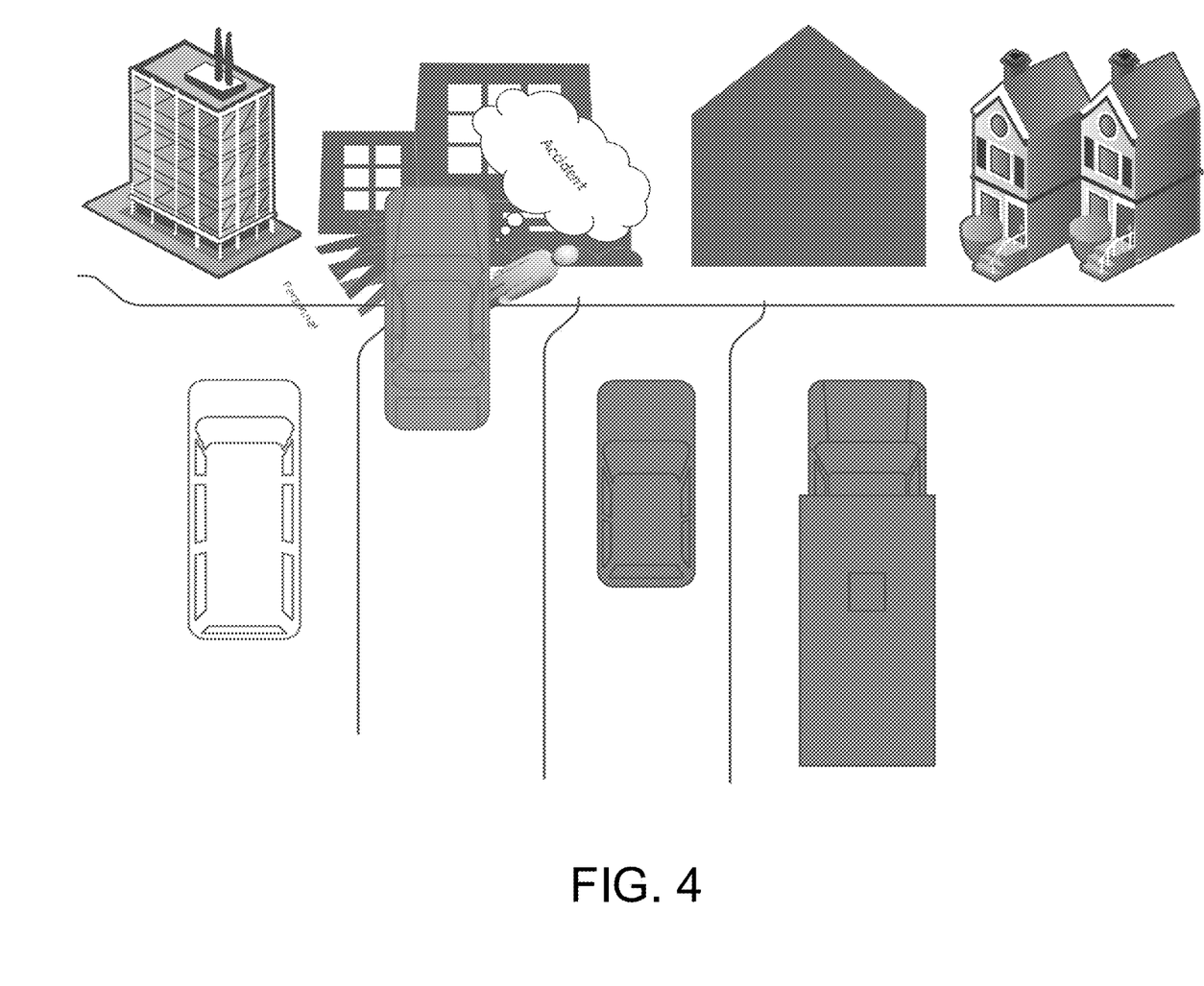
FIG. 4 is a view of the vehicle colliding with pedestrians and a building.

Referring now to FIG. 2, a student driver driving a vehicle enters a parking lot (at any speed) and approaches a parking space with the intent to slow and enter the parking space. As shown in FIG. 3, the student driver, instead of pressing the brake pedal in an attempt to slow the vehicle, presses the acceleration pedal with significant force. For example, the student driver becomes nervous about their speed and attempts to press the brake pedal with force to quickly stop the vehicle, but unintentionally presses the acceleration pedal instead. In this scenario, a sudden acceleration may cause a collision with another vehicle, pedestrians, and/or a building (see FIG. 4).

The system, while in student mode, may detect the unintended acceleration. When an unintended acceleration is detected, the system may automatically reduce or halt the acceleration entirely. In some scenarios (e.g., when objects are detected in front of or near the vehicle or predicted to cross in front of the vehicle), the system may slow the vehicle by applying the brake. The student mode may limit vehicle acceleration/velocity (e.g., to a threshold amount of acceleration/velocity) even for intended acceleration/velocity. The system may not allow or may limit rapid changes in acceleration even when the requested acceleration is below the maximum acceleration allowed by the student mode. Whenever the student mode limits control of the vehicle (e.g., by reducing acceleration or applying the brake), the system may provide a visual, audible, and/or haptic alert or warning to the driver of the vehicle (i.e., notifying the driver that control was limited by the student mode).

Figure 5:
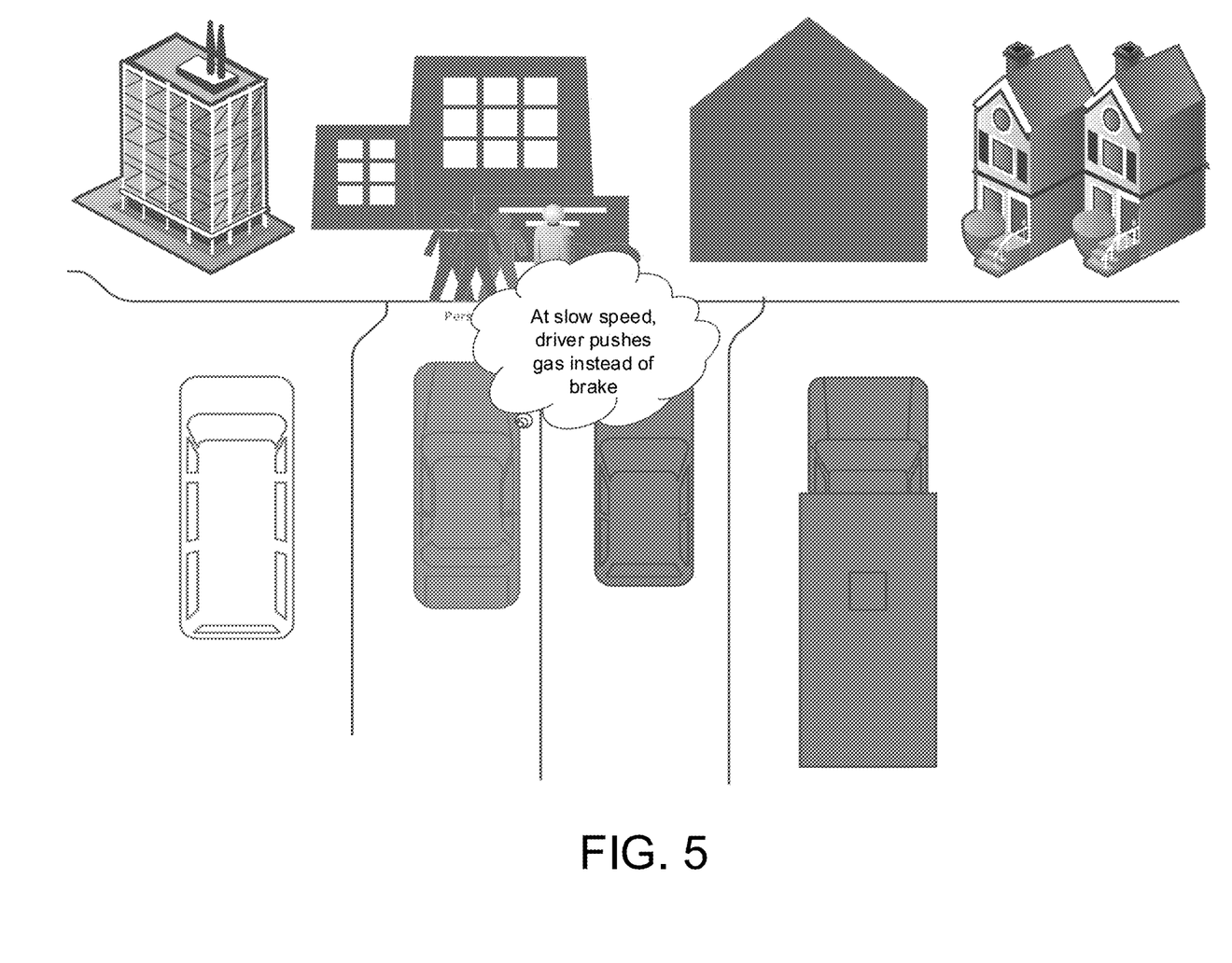
FIG. 5 is another view of the student driver unintentionally accelerating the vehicle.

Referring now to FIG. 5, in some examples, the system, while in the student mode, monitors the area surrounding the vehicle. For example, the system uses cameras, radar, and/or lidar sensors to detect the presence of objects in front of or near the vehicle (e.g., parking spaces, vehicles, pedestrians, curbs, etc.). When the system detects that the vehicle is in a parking lot (via image sensors, location sensors and map data, etc.), for example, the system may limit acceleration and/or speed of the vehicle to a "parking lot limit" (i.e., a parking lot maximum speed and/or a parking lot maximum acceleration) that is less than the maximum speed/acceleration of the vehicle. For example, the system may enforce a maximum speed of less than 5 mph, less than 10 mph, less than 20 mph, etc., while the vehicle is determined to be in a parking area and the student mode is enabled. Similarly, the system may limit the vehicle to an acceleration of less than 0.1 g, less than g, less than 0.3 g, etc. The system may apply emergency braking when the vehicle is in a parking lot and the system detects unintended acceleration. The system may include other limits for other scenarios (e.g., city streets, highways, etc.).

Figure 6:
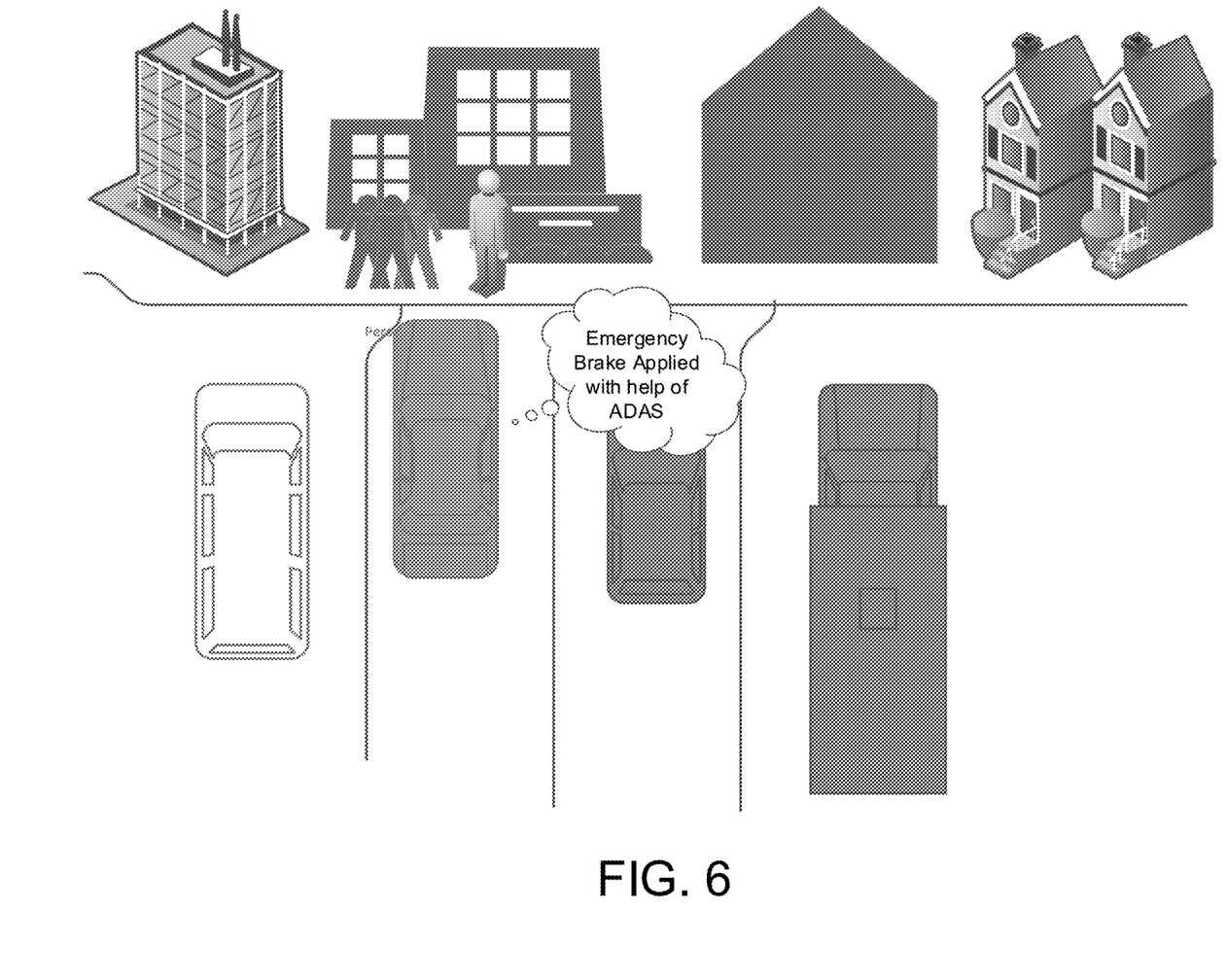
FIG. 6 is a view of the vehicle braking to avoid a collision.

As shown in FIG. 5, a student driver enters a parking lot with the intention to stop and park in a parking space. However, instead of applying the brake, the driver instead applies a significant amount of acceleration. Instead of colliding with one or more objects in front of the vehicle, the system, while the student mode is active, detects and limits the unintended acceleration. For example, the system disables heavy acceleration or throttle while in the student mode and/or automatically applies braking. As shown in FIG. 6, the system may apply emergency braking with high availability using assistance of advanced driver assistance system (ADAS) sensors, such as ultrasonic sensors, active surround view systems, camera, radar, lidar, and the like, when the system detects the vehicle is in, for example, a parking lot and/or in the vicinity of a building, pedestrians, bicyclists, or other objects.

The student mode may be enabled manually by an occupant of the vehicle. For example, the student mode may be enabled in response to actuation of a user input or human machine interface (HMI) at a console, a gear selector, or a display of the vehicle. The student mode may be enabled via a user input (e.g., voice input, interaction with a user device in communication with the vehicle such as a mobile phone, touch screen, etc.). Optionally, the student mode may be enabled automatically. For example, the student mode may enable upon identification of the driver of the vehicle. For example, the driver of the vehicle may be associated with a profile that indicates that the student mode should or may be enabled. The profile may explicitly indicate that student mode should be enabled or may provide other information (e.g., an age of the driver) that indicates that student mode should be enabled. The system may identify the driver in any number of ways. For example, the driver may select a profile upon entering or starting the vehicle, the driver may be identified via a user device possessed by the driver (e.g., a key fob, a mobile phone, etc.). The driver may be identified via an interior viewing image sensor (e.g., using facial recognition) or via a seat sensor or the like. For example, a driver monitoring camera may be disposed at an interior rearview mirror assembly of the vehicle and viewing a driver head region of the interior cabin of the vehicle.

Thus, the system offers a student mode that new or learning drivers (i.e., student drivers) may use to reduce the likelihood of accidents from inexperience of the drivers. For example, the system may detect unintentional acceleration (e.g., when the driver mistakenly presses the acceleration pedal instead of the brake pedal). The system may determine that the acceleration is unintentional based on context related to, for example, the vehicle's location (e.g., within a parking lot), objects surrounding the vehicle (e.g., a parking space), the driver's control of the vehicle prior to the acceleration, an amount of the acceleration, etc. In one example, the system determines that the acceleration is unintentional based at least in part on timing and sequencing of actuations of the acceleration pedal and/or the brake pedal. For example, when the student mode is enabled and the vehicle is located in parking lot, the system may detect that the driver releases the accelerator pedal and then rapidly presses the accelerator pedal again, indicating an unintentional acceleration (i.e., the driver intended to press the brake after releasing the accelerator, but instead pressed the accelerator again). The system may rely on imaging sensors such as cameras, radar sensors, and lidar to detect objects in front or near the vehicle. The system may reduce or restrict acceleration of the vehicle and, in some scenarios, apply emergency braking.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras.

For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may utilize sensors, such as radar sensors or imaging radar sensors or lidar sensors or the like, to detect presence of and/or range to other vehicles and objects at the intersection. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

The driver monitoring camera and/or driver monitoring system for identifying the inexperienced driver or student driver may utilize aspects of the systems described in U.S. Pat. Nos. 11,518,401; 10,958,830; 10,065,574; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or International Publication Nos. WO 2023/034956; WO 2022/241423 and/or WO 2022/187805, and/or PCT Application No. PCT/US2023/021799, filed May 11, 2023, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular control system, the vehicular control system comprising:
a sensor disposed at a vehicle equipped with the vehicular control system and sensing at least forward of the vehicle, the sensor capturing sensor data;
an electronic control unit (ECU) comprising electronic circuitry and associated software;
wherein the electronic circuitry of the ECU comprises a processor for processing sensor data captured by the sensor;
wherein the vehicular control system is operable in a student driver mode;
wherein the vehicular control system, via processing of sensor data captured by the sensor, determines when the vehicle is undertaking a parking maneuver;
wherein the vehicular control system, responsive to determining that the vehicle is undertaking the parking maneuver and when the vehicular control system is operating in the student driver mode, determines that an acceleration of the vehicle is unintentional; and
wherein the vehicular control system, responsive to determining that the acceleration of the vehicle is unintentional, limits acceleration of the vehicle.

2. The vehicular control system of claim 1, wherein the sensor comprises a camera.

3. The vehicular control system of claim 1, wherein the sensor comprises a radar sensor.

4. The vehicular control system of claim 1, wherein the sensor comprises a lidar sensor.

5. The vehicular control system of claim 1, wherein the vehicular control system, responsive to determining that the acceleration of the vehicle is unintentional, controls braking of the vehicle.

6. The vehicular control system of claim 1, wherein the vehicular control system limits acceleration of the vehicle to a parking maneuver maximum acceleration, and wherein the parking maneuver maximum acceleration is less than a maximum acceleration of the vehicle.

7. The vehicular control system of claim 1, wherein the vehicular control system limits speed of the vehicle to a parking lot maximum speed, and wherein the parking lot maximum speed is less than a maximum speed of the vehicle.

8. The vehicular control system of claim 7, wherein the parking lot maximum speed is less than 20 miles per hour.

9. The vehicular control system of claim 1, wherein the vehicular control system, when the vehicular control system is operating in the student driver mode, limits a rate of change of acceleration of the vehicle.

10. The vehicular control system of claim 1, wherein the vehicular control system, responsive to limiting acceleration of the vehicle when the vehicular control system is operating in the student driver mode, provides an alert to the driver of the vehicle.

11. The vehicular control system of claim 10, wherein the alert comprises at least one selected from the group consisting of (i) a visual warning, (ii) an audible warning, and (iii) a haptic warning.

12. The vehicular control system of claim 1, wherein the vehicular control system determines that the vehicle is undertaking the parking maneuver based at least in part on determining that the vehicle has entered a parking lot.

13. The vehicular control system of claim 12, wherein the vehicular control system determines that the vehicle has entered the parking lot based at least in part on map data.

14. The vehicular control system of claim 1, wherein the vehicular control system operates in the student driver mode responsive to identifying an inexperienced driver.

15. The vehicular control system of claim 14, wherein the vehicular control system identifies the inexperienced driver via processing of image data captured by a driver monitoring camera of the vehicle.

16. A vehicular control system, the vehicular control system comprising:
a camera disposed at a vehicle equipped with the vehicular control system and viewing at least forward of the vehicle, the camera capturing image data;
wherein the camera comprises an imager, and wherein the imager comprises a CMOS imaging array having at least one million photosensors arranged in rows and columns;
an electronic control unit (ECU) comprising electronic circuitry and associated software;
wherein the electronic circuitry of the ECU comprises an image processor for processing image data captured by the camera;
wherein the vehicular control system is operable in a student driver mode;
wherein the vehicular control system, via processing of image data captured by the camera, determines when the vehicle is undertaking a parking maneuver;
wherein the vehicular control system, responsive to determining that the vehicle is undertaking the parking maneuver and when the vehicular control system is operating in the student driver mode, determines that an acceleration of the vehicle is unintentional; and
wherein the vehicular control system, responsive to determining that the acceleration of the vehicle is unintentional, controls braking of the vehicle.

17. The vehicular control system of claim 16, wherein the vehicular control system limits acceleration of the vehicle to a parking maneuver maximum acceleration, and wherein the parking maneuver maximum acceleration is less than a maximum acceleration of the vehicle.

18. The vehicular control system of claim 16, wherein the vehicular control system limits speed of the vehicle to a parking lot maximum speed, and wherein the parking lot maximum speed is less than a maximum speed of the vehicle.

19. The vehicular control system of claim 16, wherein the vehicular control system, responsive to limiting acceleration of the vehicle when the vehicular control system is operating in the student driver mode, provides an alert to the driver of the vehicle.

20. A vehicular control system, the vehicular control system comprising:
a sensor disposed at a vehicle equipped with the vehicular control system and sensing at least forward of the vehicle, the sensor capturing sensor data;
an electronic control unit (ECU) comprising electronic circuitry and associated software;
wherein the electronic circuitry of the ECU comprises a processor for processing sensor data captured by the sensor;
wherein the vehicular control system is operable in a student driver mode responsive to identifying an inexperienced driver;
wherein the vehicular control system, via processing of sensor data captured by the sensor, determines when the vehicle is undertaking a parking maneuver based at least in part on determining that the vehicle has entered a parking lot;

wherein the vehicular control system, responsive to determining that the vehicle is undertaking the parking maneuver and when the vehicular control system is operating in the student driver mode, determines that an acceleration of the vehicle is unintentional; and wherein the vehicular control system, responsive to determining that the acceleration of the vehicle is unintentional, limits acceleration of the vehicle.

21. The vehicular control system of claim 20, wherein the vehicular control system identifies the inexperienced driver via processing of image data captured by a driver monitoring camera of the vehicle.

22. The vehicular control system of claim 20, wherein the sensor comprises a radar sensor.

23. The vehicular control system of claim 20, wherein the sensor comprises a lidar sensor.

* * * * *

UNITED STATES PATENT AND TRADEMARK OFFICE
CERTIFICATE OF CORRECTION

PATENT NO. : 12,330,670 B2  
APPLICATION NO. : 18/343867  
DATED : June 17, 2025  
INVENTOR(S) : Naresh Ravuri Page 1 of 1

It is certified that error appears in the above-identified patent and that said Letters Patent is hereby corrected as shown below:

In the Specification

<u>Column 3</u>
Line 52, "less than g," should be --less than 0.2 g,--

Signed and Sealed this
Fifteenth Day of July, 2025

Coke Morgan Stewart
*Acting Director of the United States Patent and Trademark Office*